No. 679,567. Patented July 30, 1901.
A. H. LOWE.
MEANS FOR HANDLING BAGGAGE.
(Application filed Nov. 23, 1899.)
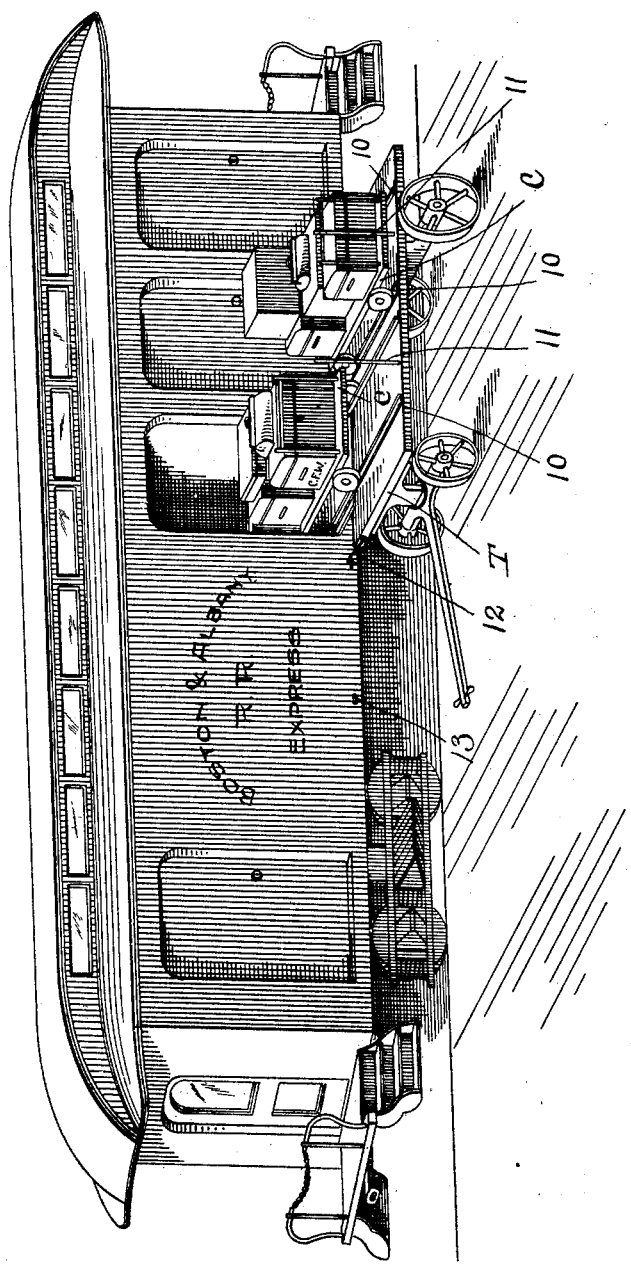
Witnesses,
C. Forrest Wesson.
M. E. Kegan.
Inventor,
A. H. Lowe.
By Southgate & Southgate Attys.

UNITED STATES PATENT OFFICE.

ARTHUR H. LOWE, OF FITCHBURG, MASSACHUSETTS.

MEANS FOR HANDLING BAGGAGE.

SPECIFICATION forming part of Letters Patent No. 679,567, dated July 30, 1901.

Application filed November 23, 1899. Serial No. 738,045. (No model.)

*To all whom it may concern:*

Be it known that I, ARTHUR H. LOWE, a citizen of the United States, residing at Fitchburg, in the county of Worcester and State of Massachusetts, have invented a new and useful Means for Handling Baggage, of which the following is a specification.

The object of my present invention is to facilitate the loading and unloading of baggage; and the especial object which I desire to accomplish is to provide an apparatus for handling baggage which is especially designed for saving the expense and time now required for putting off and taking on baggage on express-trains.

To this end my invention consists of the features of construction and combinations of parts, as hereinafter described, and more particularly pointed out in the claims at the end of this specification.

In the accompanying drawing the figure is a perspective view illustrating an apparatus for handling baggage constructed according to my invention and showing the manner in which the same is used.

The length of time that a through express-train stops at intermediate points on its route is usually controlled by the length of time required for loading and unloading the baggage from the baggage-car. As a general rule the transfer of baggage at a railroad-station takes a much longer time than is required for the transfer of passengers, for watering or recoaling the engine, or the other necessary incidents of a stop at an intermediate station. This is now so well recognized by railroad officials that on nearly all railroads the practice has been adopted of running limited trains where a quick running-time is desired. On these limited trains the passengers are allowed to carry only a limited amount of baggage; but even in operating the trains on which the amount of baggage allowed to each passenger is strictly limited it has still been found in practice that much time is necessarily wasted in the transfer of baggage at each intermediate stopping-point. In loading and unloading baggage-cars in the ordinary way each individual piece of baggage to be put off or taken on is separately handled, and as the amount of baggage to be transferred at different stations necessarily varies from day to day it is impossible to calculate in advance how much time will be required for the transfer of baggage at any one station. On some occasions, where the amount of baggage carried is comparatively small, express-trains would be easily able to run ahead of their schedule time; but in other instances, where the baggage is unusually bulky or heavy, the transfer of such baggage at the stations requires so much time as to prevent the making of schedule time and seriously interfere with the operation of the entire railroad system.

The especial object of my present invention is to provide an improved apparatus for loading and unloading baggage which will not require the separate handling of each individual piece of baggage, which will permit all baggage which is to be loaded into the car to be pushed into the car at a single operation, and which will permit all baggage which is to be put off of a car also to be drawn out of the car at a single operation. To accomplish this object, I employ movable baggage carriers or crates which preferably have sufficient capacity to hold all baggage to be loaded on at any one station, and I combine the baggage carriers or crates with a truck which can be moved to position along the side of a car and preferably secured thereto, so that the transverse tracks or ways of the truck will register with the tracks or ways extending inside the car and with those on the skid or movable piece which may be employed for connecting the car with the truck, so that a loaded baggage-carrier containing the baggage to be put on the car may be pushed into the car at a single operation and a baggage-carrier from inside the car containing the baggage to be put off may be drawn out at a single operation. This transfer of a considerable quantity of baggage at a single operation may be accomplished so speedily that express passenger-trains may be operated on shorter schedule times and the baggage transferred with less labor than where each individual piece of baggage is handled. The truck employed is preferably provided with tracks or ways, and the baggage-carriers are arranged to run on the tracks or ways, being provided with wheels for this purpose, although, if preferred, the baggage-carriers may simply slide on the tracks without being provided with wheels. Side stops are used to hold the baggage-carriers in place upon the truck, and suitable catches or locks are employed to fasten the truck in the desired position at the side of the car, so that the tracks or ways thereon will register with the tracks or ways of a short skid or plank carried by the car and with tracks or ways in the car.

Referring to the accompanying drawing and in detail, T designates a truck, which may be of substantially the same construction as an ordinary baggage-truck except that the same is preferably made considerably wider. The truck T is provided with transverse ways or tracks 10, and mounted to run on the tracks or ways 10 are baggage carriers or crates C. A plurality of baggage-carriers C is preferably employed in connection with each truck, two of such baggage-carriers being illustrated herein. The baggage-carriers C have casters or wheels running on the tracks 10, and to hold the baggage-carriers in place on the truck I preferably employ removable side stops or stakes 11. Any ordinary form of locking device may be employed for fastening the truck in its desired position alongside the car. For example, the truck T may be provided with a latch 12, which may engage eyebolts 13 in the side of the car. Connecting planks or skids having tracks for registering with the tracks or ways of the truck T and with tracks in the car may be swung out, for example, on hinges from the doorway of the car, and a loaded baggage-carrier C may then be readily pushed into or drawn out of the car, as desired. The baggage-carriers C are preferably of a length somewhat less than the width of an ordinary baggage-car, so as to leave a passage-way between the ends of the baggage-carriers and the sides of the car. After a baggage-carrier has been pushed into the baggage-car its wheels may be blocked or it may be locked in place in any desired way to prevent the same from shifting while the train is in motion.

I am aware that changes may be made in my apparatus for transferring baggage, and I do not desire to be limited to the particular arrangement which I have herein shown and described; but What I do claim, and desire to secure by Letters Patent of the United States, is—

1. In an apparatus for handling baggage, the combination of a truck mounted on wheels and having tracks or ways, a baggage-carrier mounted on the tracks or ways of said truck, and means for locking the truck to a railway-car in such position that the tracks or ways on the truck will register with the tracks or ways in the car, whereby continuous tracks will be provided for pushing a baggage-carrier from the truck into the railway-car, or for pushing a baggage-carrier from the railway-car onto the truck, substantially as described.

2. In an apparatus for handling baggage, the combination of a truck mounted on wheels and having tracks or ways extending transversely across the same, a baggage-carrier having wheels mounted to run on said tracks, and means for locking the truck to a railway-car in such position that the tracks or ways on the truck will register with the tracks or ways in the railway-car, whereby continuous tracks are provided for pushing a baggage-carrier from the truck into the railway-car, or for pushing a baggage-carrier from the railway-car onto the truck, substantially as described.

3. In an apparatus for handling baggage, the combination of a truck T mounted to run on wheels and having tracks or ways 10 extending transversely across the top of the truck, a baggage-carrier C having wheels for running on the tracks 10, hooks 12 for securing the truck to the side of a baggage-car, so that the tracks of said truck will register with tracks in the car, and a plank or skid for bridging the space between the truck and the car, said plank having tracks corresponding with the tracks of said truck, whereby a continuous track may be provided for pushing a baggage-carrier from the truck into the car, and for pushing a baggage-carrier from the car onto the truck, substantially as described.

In testimony whereof I have hereunto set my hand in the presence of two subscribing witnesses.

ARTHUR H. LOWE.

Witnesses:
PHILIP W. SOUTHGATE,
LOUIS W. SOUTHGATE.